United States Patent [19]

Müller

[11] Patent Number: 4,970,364

[45] Date of Patent: Nov. 13, 1990

[54] METHOD OF COATING INTERNAL SURFACES OF AN OBJECT BY PLASMA SPRAYING

[75] Inventor: Niklaus Müller, St. Sulpice, Switzerland

[73] Assignee: Castolin S.A., Lausanne, Switzerland

[21] Appl. No.: 392,020

[22] Filed: Aug. 10, 1989

Related U.S. Application Data

[62] Division of Ser. No. 129,986, Dec. 8, 1987, Pat. No. 4,877,937.

[30] Foreign Application Priority Data

Dec. 11, 1986 [DE] Fed. Rep. of Germany ....... 3642375

[51] Int. Cl.[5] ............ B23K 9/00

[52] U.S. Cl. ............ 219/121.47; 219/121.59; 219/76.16; 219/121.48; 427/34

[58] Field of Search ............ 219/121.47, 121.59, 219/76.15, 76.16, 121.52, 121.5, 121.48, 75; 427/34

[56] References Cited

U.S. PATENT DOCUMENTS

| | | | |
|---|---|---|---|
| 3,740,522 | 6/1973 | Muehlberger | 219/121.47 |
| 4,371,312 | 2/1983 | Tank | 219/121.47 |
| 4,472,619 | 9/1984 | Ueda et al. | 219/76.16 |
| 4,661,682 | 4/1987 | Gruner et al. | 219/121.47 |
| 4,745,256 | 5/1988 | Shubert | 219/121.47 |

FOREIGN PATENT DOCUMENTS

| | | | |
|---|---|---|---|
| 0147170 | 7/1985 | European Pat. Off. | 219/121.47 |
| 0235092 | 9/1988 | Japan | 219/121.47 |

*Primary Examiner*—M. H. Paschall

*Attorney, Agent, or Firm*—Bachman & LaPointe

[57] ABSTRACT

A plasma spray torch comprises a spray nozzle which forms an electrode and which includes a nozzle duct, and a second electrode associated therewith, in a portion of a torch arm which is electrically insulated from the spray nozzle. The torch arm has flow passages for a working gas and for a cooling agent, the latter flowing in one of the flow ducts to the nozzle and being removed after producing its cooling effect from another flow duct. A powder feed conduit opens into the nozzle duct. The working gas flow duct is connected to a duct which passes through the second electrode while at least in the region of its mouth opening, the nozzle duct is inclined relative to the longitudinal axis of the torch arm or the flow duct therein. In a method of internally coating a tube by plasma spraying, the torch is introduced into the tube which is then rotated and moved axially relative to the torch during the spray operation.

9 Claims, 2 Drawing Sheets

METHOD OF COATING INTERNAL SURFACES OF AN OBJECT BY PLASMA SPRAYING

This is a division of application Ser. No. 129,986 filed Dec. 8, 1987 now U.S. Pat. No. 4,877,937.

The invention relates to a plasma spray torch comprising a spray nozzle which forms an electrode and which includes a nozzle duct and which in particular is connected anodically, and a second electrode associated with the spray nozzle, in a torch portion, which is electrically insulated relative to the spray nozzle, of a torch arm which has flow ducts for working gas and for cooling agent which flows nozzle-wards in one of the flow ducts and which, after the cooling operation has taken place, is discharged from another flow duct, wherein a feed duct for powder opens into the nozzle duct. The invention also relates to a method of internally coating a tube.

An apparatus of that nature is proposed in German laid-open application (DE-OS) No. 34 30 383, for the production of internal coatings in holding grooves in turbine discs. That apparatus comprises a torch head with anode and cathode half-shell portions which can be pivoted away from each other; carried in the latter half-shell portion is an electrode which projects into the nozzle duct of a spray nozzle in the anodic portion of the torch head. The direction of spray in that arrangement is at right angles to the axis of the torch head, while the feed of powder is very closely adjacent to the electrode, directly at the wall of the nozzle duct.

For cooling purposes, the arrangement has nozzle openings on a nozzle ring which is disposed in a support-like manner around the torch head at a spacing relative to the nozzle duct; the abovementioned openings provide for the production, for cooling purposes, of a gas protective envelope which is also intended to blow spray dust and powder away.

The previous arrangement is essentially restricted to a rotationally symmetrical configuration of the electrode head which projects into a torch nozzle which is of a particular configuration in terms of cross-section.

Having regard to that art, the inventor set himself the object of improving a plasma spray torch of the kind set forth in the opening part of this specification, for the internal coating of very narrow tubes or the like cavities or hollow spaces, in terms of its mode of operation, and in particular controlling the adjustability of its arc and the relationship thereof relative to the fusion zone, and optimising the cooling action. In addition the invention seeks to provide that the construction of the plasma spray torch is of a completely different configuration which also simplifies access to the individual components.

That object is achieved in that the flow duct for the working gas joins a duct which passes through the second electrode and, at least in the region of its mouth, the nozzle duct is inclined at an angle relative to the longitudinal axis of the torch arm or the flow duct.

In addition, that region of the nozzle duct, which is inclined with respect to the longitudinal axis, is to extend substantially at a right angle to an outside surface, which in turn is inclined, of the spray nozzle, while the angle of inclination between the nozzle duct and the longitudinal axis is preferably about 45°. It will appreciated however that it is also possible to deviate to a limited extent from that feature, without departing from the invention. The fact that the working gas is passed through the electrode simplifies the torch construction and permits the spray nozzle to be of an advantageous configuration.

In accordance with a further feature of the invention, connected between the flow duct for the working gas and the duct of the second electrode is a bore in a cooling body which is surrounded by a cooling jacket space, as a flow space for the cooling agent, the cooling jacket space being integrated into the torch according to the invention. The cooling agent is here advantageously cooling fluid which can be supplied to the spray nozzle so that the cooling is there in any event highly effective. There is no outer gas protective envelope whose flow can have an adverse effect on the plasma layer which is formed.

In regard to the configuration of the plasma spray torch according to the invention but in particular in regard to the very small diameter of the torch arm of about 20 mm, a feature which is of particular significance is that the flow duct for the working gas is disposed in a central tube of the torch arm, along which the cooling agent directly flows to the electrode; with a coaxial tube of electrically non-conducting material, the central tube defines the inner cooling jacket space.

The central tube is directly connected to the above-described second electrode and also serves as a current supply means therefor. In principle it is possible for the anode to be mounted to the central tube and for the spray nozzle to connected cathodically, but hereinafter it is assumed that the spray nozzle advantageously embodies the anode portion of the electrode system and the cathode is carried on the central tube. The reverse of that arrangement also falls within the scope of the invention.

Preferably, the coaxial tube is surrounded at a spacing by a jacket tube and with same forms a second cooling jacket space which is in communication with the first-mentioned inner jacket cooling space in the region of the spray nozzle; the inner jacket cooling space carries the liquid cooling agent in the cold condition to the spray nozzle where it is deflected around the free edge of the coaxial tube and carried away through the outer cooling jacket space. It has been found advantageous for the coaxial tube to be made from acrylic glass which is supported against spacers of the central tube without thereby adversely affecting the axial mobility of the central tube relative to the acrylic glass tube or the like.

The above-mentioned jacket tube forms the outside surface of the torch arm, while in addition, in a preferred embodiment, it also forms the feed means of the current to the anodic—or cathodic—spray nozzle, which closes off the jacket tube in a forward direction.

The plasma spray torch according to the invention therefore has three concentric cavities or spaces, namely the flow duct for the working gas, which is disposed on the longitudinal axis of the torch arm, and the two cooling agent jackets which surround it.

In accordance with the invention, disposed at the end of the central tube is the above-mentioned cooling body which projects with radially projecting cooling ribs into the inner cooling agent jacket and thereby affords the cooling agent a comparatively large surface area for heat exchange purposes.

In the direction of flow, projecting out of that copper cooling body is the cathode which is made from the same material and which, with a tip which provides a good flow configuration, comprises a material with a high melting point and a lower degree of electrical conductivity than the cathode body. Tungsten presents itself for that purpose, with a melting point of 3390° C. and a level of conductivity which is about two thirds lower than that of the copper. The cathode projects into a cavity in the spray nozzle, which is disposed upstream of the nozzle duct, more particularly in such a way that transverse bores which, in accordance with the invention, are inclined in the direction of flow, open laterally at the cathode, as end portions of the flow duct for the working gas. Thus, the flow duct passes in a directed mode into an annular space between the cathode and the anode and flows at the above-described cathode tip within a conically tapering portion of the spray nozzle forwardly into the adjoining nozzle duct where the arc which is normal in such apparatuses is to be found, in the operative position of the plasma spray torch. The tip thereof is at such an adequate spacing from the powder feed which is provided adjacent the mouth opening of the nozzle duct, that sufficient fusion effect is ensured even in respect of metal particles with a high melting point; the region of highest effectiveness of the arc is at a short spacing from the end thereof.

A feature which is of particular significance in relation to the subject-matter of the invention is that the central tube is mounted axially movably so that the position of the arc can be easily changed by simply displacing the central tube with its cathode tip portion.

In accordance with the invention, for the purposes of mounting the cathode, adjoining a conically flaring cavity in the spray nozzle is the internal space of a cylindrical portion which bears sealingly against an insulating ring, preferably comprising aluminium oxide or the like pore-free ceramic material. The ceramic cylinder surrounds a portion of the cooling body and rests with same preferably axially slidably in the cylindrical portion of the spray nozzle.

The cooling effect is highly effective as the cooling body is provided outwardly with cooling ribs which project radially into the inner cooling jacket space.

It is in accordance with the invention that the spray nozzle which closes the jacket tube towards its end provides two outside surfaces which together include an angle of preferably 90°, of which one is connected to the nozzle duct by at least one bore, said bore being connected to an outer feed tube as a feed duct for powder, extending substantially parallel to the jacket tube.

In the preferred embodiment of the plasma spray torch, the jacket tube thereof is formed as a current feed means for the spray nozzle, being produced therefore for example from brass. In special cases however it is also possible to provide an electrically conducting material on the feed tube, said material being connected to the spray nozzle which is then insulated relative to the torch arm.

The configuration of the housing-like support from which the torch arm projects is also of significance: an end portion or the like of electrically conducting material, which is connected to the central tube, is fixedly connected to a front support portion of electrically conducting material, with the interposition of an electrically insulating intermediate ring, wherein preferably the front support portion embraces the central tube at a spacing and is fixedly connected to the jacket tube.

In accordance with the invention, a bush-like receiving body of electrically insulating material is mounted in the front support portion, with a collar which is connected to the coaxial tube of non-conducting material. The receiving body surrounds the central tube in such a way that, with the central tube, it forms a portion of the inner cooling jacket space and, in the region of the end portion, with a bottom part which bears against the central tube, radially delimits the inner cooling jacket space.

The inner cooling jacket space in the end portion and the outer cooling jacket space in the front support portion are respectively connected to a per se known hose connection or the like, each of which also serves for the current connection; thus the end portion is connected to the negative terminal of a power line by way of a hose connection when the electrode of the central tube is cathodic.

The central tube is movable with the cathode by virtue of the feature that the central tube projects out of the end portion through an end opening in the end portion, said opening flaring conically endwards, and the end opening accommodates a conically tapering cooperating portion which is a central projection on an end disc connected to the end portion while knurled nuts on a male screwthread of the central tube are associated with the end disc.

The invention also embraces a method of internally coating a tube by plasma spraying wherein the tube which is of an inside diameter of less than 30 mm is pushed on to the torch arm whereupon the plasma spray torch is ignited and during the plasma spray operation the tube which is in turn cooled is rotated and moved axially relative to the torch arm. The corrosion-resistant inner layer which is applied in that way, for example in an aluminium tube which is used as a battery casing, is produced in a very simple manner and is totally acceptable.

Further advantages, features and details of the invention will be apparent from the following description of a preferred embodiment and with reference to the accompanying drawings in which.

Figures 1, 2:
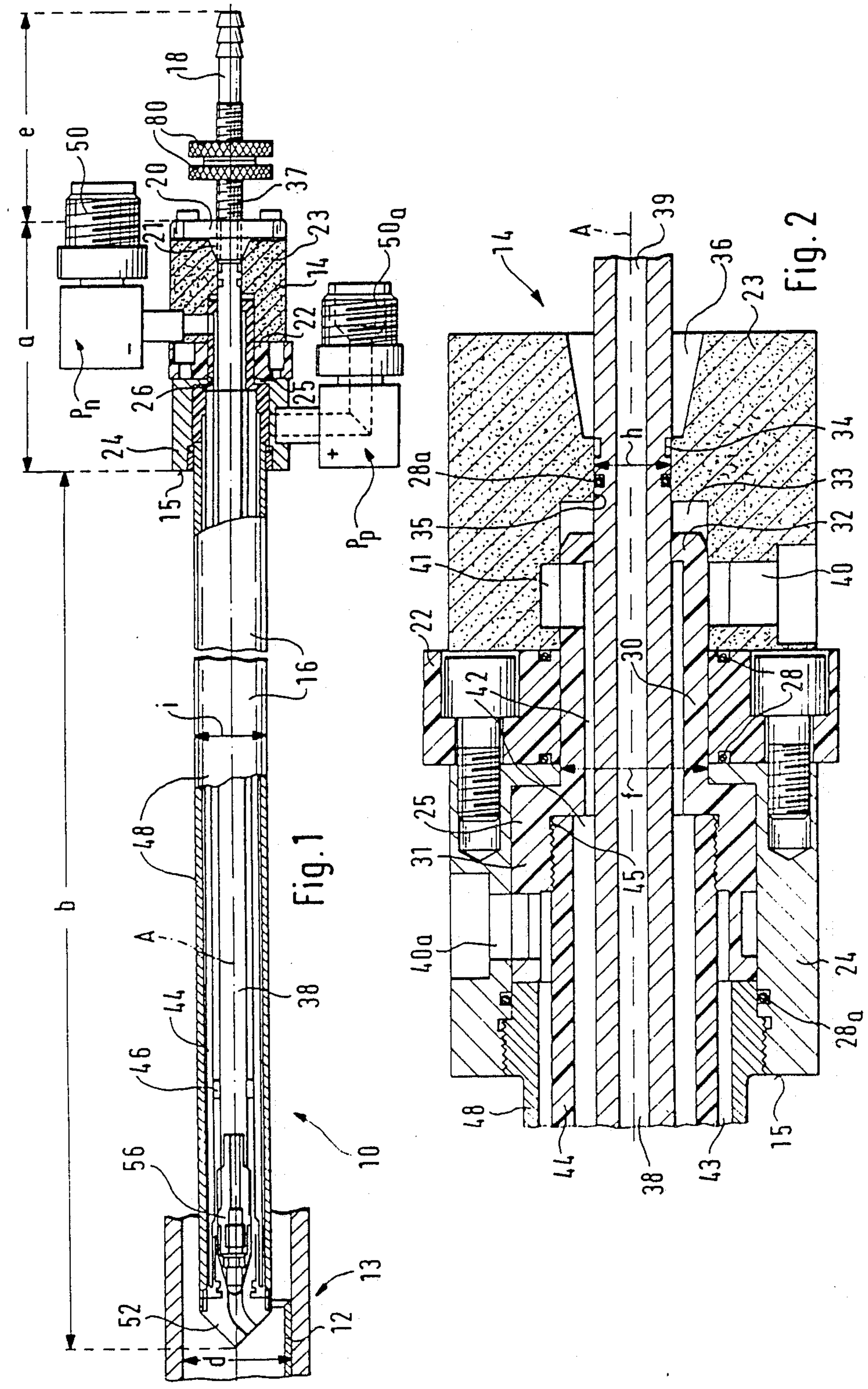
FIG. 1 is a partly sectional plan view of a spray apparatus for plasma with connecting housing and torch arm.
FIG. 2 is a view in longitudinal section on an enlarged scale relative to FIG. 1, showing the region of the connecting housing.

A spray torch 10 for plasma for producing a corrosion-resistant internal coating or layer 12 on a light metal or alloy tube which is indicated at 13 and which is about 220 mm in length and which is of an inside diameter as indicated by d of about 30 mm comprises, on a support or connecting housing 14 which is formed from hard plastic impregnated fabric, of a length a of for example 75 mm, a bar-like torch arm 16 of an outside diameter i of about 20 mm and a cantilever length b of 480 mm in this case, as measured from an end face 15 of the housing. A connecting tube 18 which extends on the longitudinal axis A of the plasma spray torch 10 projects from an end disc 20, which forms the other end face of the housing, with a free length e of about 60 mm.

As can be seen in particular from FIG. 2, the connecting housing 14 comprises two portions of brass or the like metal, which are separated by an intermediate ring 22 of electrically insulating material such as acetal resin and which are fixedly connected thereto by screws. The two parts of the housing 14 are more specifically a block-like end portion 23 and a bush 24 which accommodates the one end of the torch arm 16 and whose end plate portion 25 is provided with a central opening 26 of a diameter f of about 13.5 mm and which, by virtue of an O-ring 28 fitted into the intermediate ring 22, bears sealingly against same; such an O-ring 28 is also to be found at the surface of the intermediate ring 22, which is adjacent to the end portion 23.

Introduced into the bush 24 is a hollow receiving body 30 which passes through the opening 26 thereof and which comprises polytetrafluoroethylene (PTFE) which possibly contains fillers, or the like; within the bush 24 it has a collar 31 which is of L-shaped cross-section and it engages through the intermediate ring 22 into a blind bore 33 in the end portion 23. Extending in the blind bore 33 at a spacing from the end thereof is an end ring 32 of the receiving body 30 which, by virtue of a central axial bore 34, appears as a shoulder-like annular surface 35. The axial bore 34 is comparatively short and goes into an end opening which flares conically from the bore.

The annular opening of the end ring 32 and the adjoining axial bore 34 in the end portion 23 are of equal width (=h of about 7 mm) which corresponds to the outside diameter of a central tube 38 of brass or like metal, which is passed therethrough and which is surrounded in the axial bore 34 by a sealing ring $28_a$. Like also the O-ring 28 on the intermediate ring 22, the sealing ring $28_a$ is necessary in order to seal off the blind bore 33 which can be connected by way of a transverse bore 40 in the end portion 23 to a water system which is not shown for the sake of clarity of the drawing, and with the central tube 38 defines an annular water space. The latter is in communication by way of an opening 41 with the interior of the receiving body 30 which in turn, with the central tube 38, forms a space 42 for a water jacket.

The space 42 for the water jacket is extended beyond the receiving body 30; the central tube 38 is surrounded at a spacing by a coaxial and preferably translucent plastic tube 44 which is screwed to the receiving body 30 at 45 and bears against a spacer ring 46 with axis-parallel openings 47, being the spacer ring 46 for the central tube.

A second concentric water space 43 is disposed outside the plastic tube 44 and is delimited outwardly by a jacket tube 48 of brass as the outer part of the torch arm 16, which is sealingly carried towards its end in the bush 24. The outer water space 43 is connected for fluid flow on the one hand at the end edge 49 of the plastic tube 44 to the inner water space 42 and on the other hand. within the collar 31 of the receiving body 30, to a transverse bore $40_a$ which is in radially opposite relationship to the first-described transverse bore 40; the two transverse bores 40 and $40_a$ are in communication with outer hose connections 50 and $50_a$, in respect of which it can be seen that one thereof projects laterally from the end portion 23 and the other from the bush 24.

The central tube 38 terminates at a spacing q from the free end of the apparatus 10, in the form of a thin-walled end portion which is reduced in a shoulder-like configuration at 53; the free end of the apparatus 10 is formed by a ridge line 77 of outside surfaces 51 and $51_a$ of a spray nozzle 52, which are arranged in the manner of a saddle-type or ridged roof.

Figures 3, 4, 5, 6, 7, 8, 9:
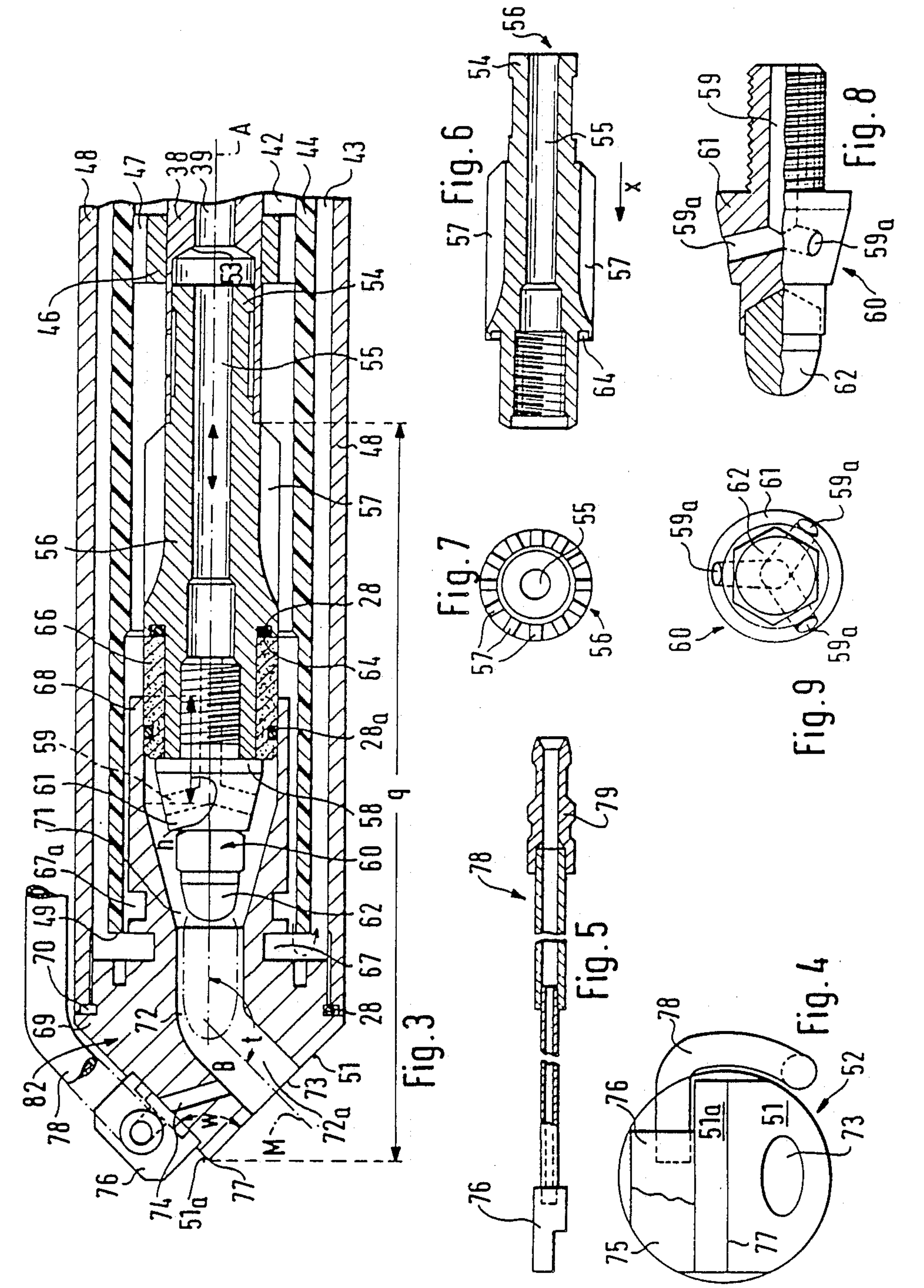
FIG. 3 is a partial view in longitudinal section on a larger scale than FIG. 1, through a part of the torch arm with powder feed.
FIG. 4 is a front view of FIG. 3.
FIG. 5 is a view in longitudinal section through the powder feed.
FIG. 6 is a view in longitudinal section through a detail of the torch arm.
FIG. 7 is an axial view of FIG. 6.
FIG. 8 is a partly sectional side view of a part of FIG. 3.
FIG. 9 is a front view of FIG. 8.

Soldered into the end portion is an open tubular end 54 of a cooling body 56 of copper, which has radially projecting cooling ribs 57; an axial bore 55 in the cooling body 56 extends the internal space 39 in the central tube 38 and, as shown in FIG. 3, goes into an axial duct 59 with three transverse bores $59_a$ which are inclined relative to the longitudinal axis A, of a cathode 60 which axially extends the cooling body 56 and covers over its end face 58 with a collar 61. Fitted into the collar, also axially, is a cathode tip 62 of tungsten, which is of a hemispherical configuration.

Extending between the collar 61 of the cathode 60 and a shoulder portion 64 which is to be found on the end of the cooling ribs 57 towards the cathode and which is provided with an O-ring 28 is cylinder 66 of oxide ceramic, preferably $Al_2O_3$, against which a cylindrical push-on portion 68 of an anode snugly bears, at the outside, with the interposition of a seal $28_a$; the anode is formed by the spray nozzle 52 which comprises the push-on portion 68 and a head portion 69 which is screwed into the jacket tube 48 with a step portion 70 reduced in a shoulder-like configuration, and which on both sides of the longitudinal axis A presents the above-mentioned outside surfaces 51 and $51_a$ which together include an angle w of 90°. Radial grooves 67 and $67_a$ are to be seen at the transition from the head portion 69 to the push-on portion 68.

The anodic spray nozzle 52 has a conical cavity 71 which accommodates the cathode 60 and which is adjoined by a nozzle duct 72. As shown in FIG. 3, the nozzle duct 72 is curved in respect of its longitudinal section, in order to open at the one outside surface 51, that is to say the axis M of its mouth portion $72_a$ extends at an angle t of 45° relative to the longitudinal axis A and thus also in the operative position shown in FIG. 1, at an angle of 45° relative to the inside surface of the light metal or alloy tube 12 to be coated.

An inclined bore 74 of the spray nozzle 52 terminates at the nozzle duct 72 adjacent the mouth opening 73 thereof. The inclined bore 74 is connected at the other end to a block-like attachment 76 which rests in a groove-like recess 75 in the outside surface $51_a$ and which extends parallel to the ridge line 77 of the nozzle and which is part of a feed tube 78 for powder. The feed tube 78 extends with its connecting end 79 at the outside surface of the jacket tube 48.

The central tube 38 projects with its end remote from the spray nozzle 52 out of the connecting housing 14 or the end portion 23 thereof and, as shown in FIG. 1, passes through the disc 20 which is fitted with a conical projection portion 21 into the end opening 36. The disc 20 with its conical projection portion 21 is screwed on to a male screwthread 37 of the central tube 38.

The male screwthread 37 also carries two knurled nuts 80. The above-mentioned male screwthread 37 on the central tube 38 is followed, to the right in FIG. 1, by the connecting end 18 of the central tube 38 which is connected to a conduit (not shown) for a working gas, to make the apparatus ready for operation; the gas mixture passes through the internal space 39 in the central tube 38 and the axial bore 55 in the cooling body 56 in the direction of flow as indicated by x into the hollow space 71 in the spray nozzle 52 and there surrounds an arc which is only indicated at B in FIG. 3 and terminates in front of the inclined bore 74 for the feed of powder.

The arc B is produced between the anode 52 and the cathode 60; the latter is connected by way of the metal central tube 38 and the end portion 23 of the gripping housing 14 to a negative terminal which is indicated by $P_n$ in FIG. 1 while the anode is connected to a positive terminal $P_p$ by way of the jacket tube 48 and the bush 24.

In the case of the hose connection 50 of the end portion 23, the cooling water passes into the spray torch 10, forms the inner water jacket 42 at the central tube 38, flows after contacting the cooling body 56 around the end edge 49 of the plastic tube 44 into the outer space 43, and then flows in that space to the hose connection $50_a$ of the bush 24.

A change in the arc can be effected by axial displacement of the cathode 60; the length n of the push-on portion 68 of the anode 52 determines the extent of that axial displacement for it permits a change in that respect in the position of the cathode 60, by means of the central tube 38.

The transfer of current thereto is moreover always ensured by the conical projection portion 21 and the outside surface thereof, which bears against the end portion 23.

I claim:

1. A method of coating the internal surface of a tube by plasma spraying by means of a plasma spray torch which has a torch arm, said method comprising pushing a tube of an inside diameter of less than 30 mm onto the torch arm; igniting the plasma spray torch, and during the plasma spray operation turning the tube and moving it axially relative to the torch arm so as to form a layer having a thickness of between 0.01 and 0.5 mm over the internal surface of the tube further comprising using a spray material comprising a Co-base alloy powder with a composition between:

C 0.6–3.0%
Si 0.2–2.0%
Cr 26.0–33.0%
W 2.0–15.0%
Ni 0–5.0%
Fe 0–5.0%
Co balance.

2. A method as set forth in claim 1 wherein said spray material which is used comprises a mix of said Co-base alloy powder with 5–95% of a Mo powder.

3. A method as set forth in claim 2 wherein a Mo metal powder with 98% Mo is used as spray material.

4. A method as set forth in claim 1 wherein the powder composition comprises from about 0.01 to 5.0% nickel.

5. A method as set forth in claim 1 wherein the powder composition comprises from about 0.01 to 5.0% iron.

6. A method of coating the internal surface of a tube by plasma spraying by means of a plasma spray torch which has a torch arm, said method comprising pushing a tube of an inside diameter of less than 30 mm onto the torch arm; igniting the plasma spray torch, and during the plasma spray operation turning the tube and moving it axially relative to the torch arm so as to form a layer having a thickness of between 0.01 and 0.5 mm over the internal surface of the tube further comprising using a spray material on the basis of a Ni Mo alloy with additions of up to 30% Fe and up to 5% B.

7. A method of coating the internal surface of a tube by plasma spraying by means of a plasma spray torch which has a torch arm, said method comprising pushing a tube of an inside diameter of less than 30 mm onto the torch arm; igniting the plasma spray torch, and during the plasma spray operation turning the tube and moving it axially relative to the torch arm so as to form a layer having a thickness of between 0.01 and 0.5 mm over the internal surface of the tube further comprising using a Ni-Cr-base alloy powder with 15% Cr and additions of up to 20% of an element selected from the group consisting of Mo, Fe, B, Si and mixtures thereof as the spray material.

8. A method of coating the internal surface of a tube by plasma spraying by means of a plasma spray torch which has a torch arm, said method comprising pushing a tube of an inside diameter of less than 30 mm onto the torch arm; igniting the plasma spray torch, and during the plasma spray operation turning the tube and moving it axially relative to the torch arm so as to form a layer having a thickness of between 0.01 and 0.5 mm over the internal surface of the tube further comprising using an Fe-Mo-base alloy powder with 10% Mo and additions of 5% Ni and up to 5% of the usual elements present in steel alloys such as Mn, Si and C, as the spray material.

9. A method of coating the internal surface of a tube by plasma spraying by means of a plasma spray torch which has a torch arm, said method comprising pushing a tube of an inside diameter of less than 30 mm onto the torch arm; igniting the plasma spray torch, and during the plasma spray operation turning the tube and moving it axially relative to the torch arm so as to form a layer having a thickness of between 0.01 and 0.5 mm over the internal surface of the tube further comprising using a Cr-base alloy powder with additions of up to 10% C, up to 30% Fe and up to 30% Mo as the spray material.

* * * * *